May 31, 1932. C. S. BRYAN 1,860,527
PROCESSING OF SLUDGES AND THE LIKE
Filed April 15, 1931
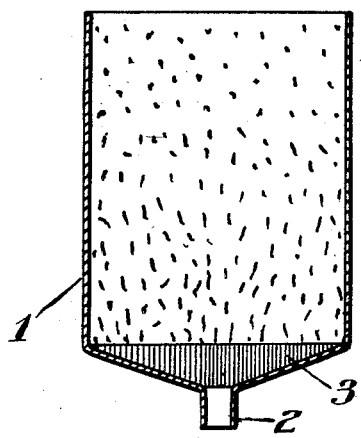
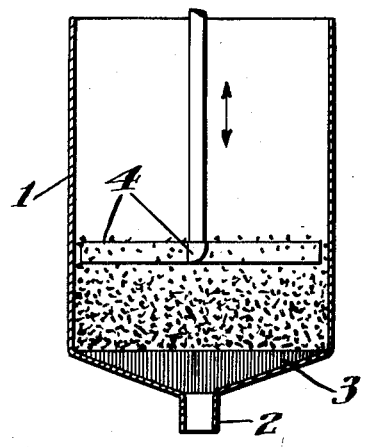
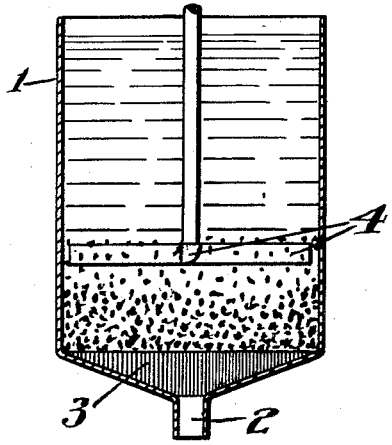
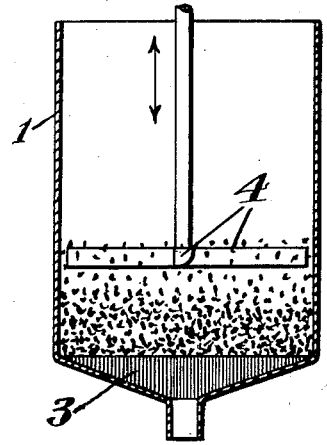
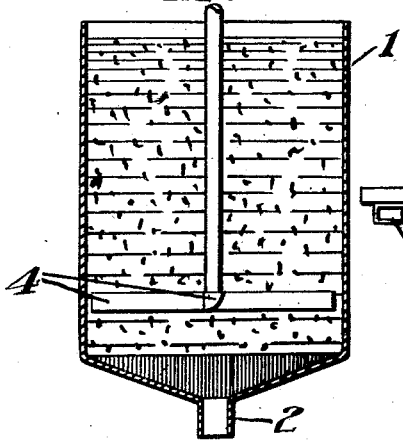
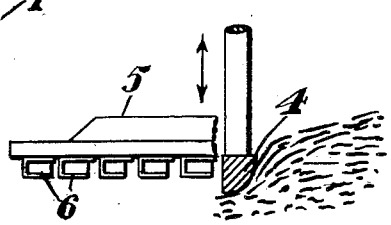
Inventor
Charles S. Bryan
By Attorney Patented May 31, 1932

1,860,527

UNITED STATES PATENT OFFICE

CHARLES S. BRYAN, OF RUMFORD, RHODE ISLAND, ASSIGNOR TO RUMFORD CHEMICAL WORKS, OF RUMFORD, RHODE ISLAND, A CORPORATION OF RHODE ISLAND

PROCESSING OF SLUDGES AND THE LIKE

Application filed April 15, 1931. Serial No. 530,219.

This invention involves the processing of sludges, slurries or the like, in which finely divided or crystalline material is suspended in a body of liquid from which it is to be separated as for subsequent processing. In many of these sludges it is highly important to get a complete separation of the liquor from the suspended material, in some cases because of the value of the liquor, in others because of the deleterious effect of the liquid if partly left with the solid, and in some instances both considerations are present.

While my invention is useful in the processing of various materials, I cite as illustrative a by-product calcium sulphate, such for example, as that from acid manufacture, as this affords not only a very characteristic illustration, but is in itself a product for which my invention is very important and to which it is peculiarly adapted in producing certain very important results.

Such a sludge or slurry is also of characteristic importance in that its solid matter is in a very finely divided state due to the fact that it is a precipitate and one found to have unusual properties on account of its very fine crystalline condition.

Certain methods or processes of treatment have been developed which may be best carried on with the material, such as calcium sulphate, in a water suspension free from deleterious matters and still having its desired crystalline factors of advantage.

In carrying out my invention I take such a sludge or slurry and dewater or filter it as on a sand bed to which suction is applied to draw through the liquor in which the material is suspended in the original slurry.

In doing this and for reasons later appearing, my invention contemplates a very light non-compacted deposit of material. I therefore allow the material to deposit with as little densification of the cake as possible and in so doing the following steps become important.

In practice as soon as the main body of the supernatant liquid has been drawn through the material and the incipient top of the deposit begins to become apparent, I impart to the slurry over the cake a swirling action by which a wave or waves are caused to sweep around the surface, said waves having a radial resultant tending to move the material outwardly against the wall of the agitating chamber from which the material eddies back toward the center, thus producing a traversing and re-traversing of the surface of the non-compacted material as it forms.

As this goes on and with the continuing withdrawal of the fluid, there is a continuing thickening of the slurry at the forming surface which becomes more and more of a plastic until the impellers employed to produce the wave are really pushing or rolling a crest or crests of thick plastic nature over the more solid part of the deposit.

In this way I get a rapid removal of fluid without building up a dense or compacted depth of the material. As the material is lightly deposited it offers a minimum of resistance to the passage of the liquid thus requiring a minimum of suction and of power, leaving the material in the fine crystalline state heretofore described as so desirable.

Furthermore, this swirling of the slurry or movement of the plastic wave prevents the formation of any cracks or, if cracks or openings start, these are promptly closed by the movement of the plastic wave over the surface.

When the charge is of the proper consistency and while the surface is still plastic I then begin the washing step during which the plasticity of the surface is maintained and the deposited material thoroughly washed. As the wave or plasticizing movement is maintained the washing is effected without the formation of cracks or loss of material deposited or vacuum.

After the washing has been completed and the wash water withdrawn so that the incipient surface is again reaching its maximum plasticity, I then add sufficient secondary fluid which may be for suspension for further treatment, continuing the surface action preferably with increased agitation and progressive stirring or scouring of the material until substantially all of the material is brought into the desired state of suspension.

I then draw or pump off this new suspension which now consists of a material such as the gypsum precipitate in a high degree of purity and in a state of crystalline fineness. The suspension may now be processed or re-processed as desired, either as a suspension and later in a concentrated condition according to the ultimate product desired. The material may also be treated or partly treated during the formation of the new suspension.

My invention may be practiced with various apparatus of various arrangement. As illustrative of a simple form of such apparatus and of the wave formation to be maintained, I have shown somewhat diagrammatically in the accompanying drawings the following.

Fig. 1 is a sectional view through a settling chamber filled with a slurry.

Fig. 2 a similar view showing the slurry substantially deposited with the impeller working on the plastic top.

Fig. 3 a similar view showing the wash water added.

Fig. 4 a view showing the chamber after the wash water is withdrawn and the rotary members working on the plastic top.

Fig. 5 a view showing the chamber with the material re-suspended with the impellers working, and Fig. 6 a diagrammatic view showing one of the impellers pushing the wave of the plastic material at the top of the deposit.

In these drawings the apparatus is indicated at 1 the exhaust at 2, the permeable bottom at 3. I have not attempted to indicate differentiations in the condition of the material within the apparatus because as before described this condition is changing throughout successive steps.

From the original sludge or slurry is extracted the original liquid of suspension during which the precipitate is built up lightly as described into a deposit with a plastic depth of upper surface. This in turn is washed and then re-suspended and removed. The wave action is produced by impellers such as 4. I may also provide agitators 5 and pulping members 6 all of which may be raised and lowered as indicated by the arrows to bring them to the proper level or depth as the action goes on.

The wave impellers 4 when in action are working on the plastic upper depth of the deposit or incipient top of the deposit, but may be used as stirrers either alone or with the agitators 5 and the pulpers or scrapers 6 which are lowered as material is again brought to suspension as above described.

The apparatus may be of varied form and the steps arranged or varied. From any such variants if in accordance with the invention, the resultant product will be of the desired characteristics.

In the step of washing there is, of course, a tendency in the plastic depth to re-suspend but even if there is a slight re-suspension in the wash water it is at once carried into and left with the previously deposited material so that there is in practice no appreciable loss.

What I therefore claim and desire to secure by Letters Patent is:—

1. In the processing of sludges, slurries or the like, of finely divided or crystalline material such as precipitates, those steps consisting in withdrawing the liquor to effect a light, non-compacted deposit of the material having a plastic surface, in maintaining a plasticizing movement of the surface of the deposit while maintaining that portion of the deposit remote from the surface undisturbed, and in washing the deposit while continuing the surface movement thereof and while maintaining the surface of the deposit plastic.

2. In the processing of sludges, slurries or the like, of finely divided or crystalline material such as precipitates, those steps consisting in progressively withdrawn the liquor of the original precipitate to effect a light, non-compacted deposit of the material having a plastic surface, in maintaining plasticizing movement of the surface circumferentially of the deposit while maintaining that portion of the deposit remote from the surface undisturbed during withdrawal of the liquor, in washing the deposit while continuing the surface movement thereof and withdrawing substantially all of the wash water while continuing the surface movement of the deposit.

3. In the processing of sludges, slurries or the like, those steps consisting in withdrawing the liquor from the original sludge leaving a deposit having a plastic surface, in maintaining a plasticizing movement of the surface of the deposit during withdrawal of the liquor and while maintaining that portion of the deposit remote from the surface undisturbed.

4. In the processing of sludges, slurries or the like, those steps consisting in withdrawing the liquor from the original sludge leaving a deposit having a plastic surface, in maintaining a plasticizing movement of the surface of the deposit during withdrawal of the liquor and while maintaining that portion of the deposit remote from the surface undisturbed, and in then washing the deposit.

5. In the processing of sludges, slurries or the like, those steps consisting in withdrawing the liquor of the original precipitate to effect a deposit of the material in a nondensified condition having a plastic surface, in maintaining movement of the surface of the deposit during withdrawal of the liquor and while maintaining the bottom portion of the deposit undisturbed, and in washing and draining the deposit while continuing the surface movement thereof.

In testimony whereof I affix my signature.

CHARLES S. BRYAN.